United States Patent
Flothmann et al.

(10) Patent No.: US 10,632,929 B2
(45) Date of Patent: Apr. 28, 2020

(54) BLIND ESPECIALLY FOR STORAGE COMPARTMENT IN A MOTOR VEHICLE

(71) Applicant: fischer automotive systems GmbH & Co. KG, Horb a.N. (DE)

(72) Inventors: Jorg Flothmann, Bondorf (DE); Gunter Leopold, Baiersbronn (DE)

(73) Assignee: fischer automotive systems GmbH & Co. KG, Horb A.N. (DE)

( * ) Notice: Subject to any disclaimer, the term of this patent is extended or adjusted under 35 U.S.C. 154(b) by 81 days.

(21) Appl. No.: 15/067,678

(22) Filed: Mar. 11, 2016

(65) Prior Publication Data

US 2016/0280141 A1   Sep. 29, 2016

(30) Foreign Application Priority Data

Mar. 27, 2015 (DE) .......................... 10 2015 004 013

(51) Int. Cl.
*B60R 7/04* (2006.01)
(52) U.S. Cl.
CPC ...................................... *B60R 7/04* (2013.01)
(58) Field of Classification Search
CPC ......... B60R 7/04; B60R 13/0262; E06B 9/11; E06B 2009/1505; E06B 2009/1522; E06B 2009/1533; E06B 2009/1538; E06B 2009/155; E06B 2009/1566; E06B 2009/1588; E06B 2009/1594; E06B 9/15; E06B 9/08
USPC ....................................................... 220/255
See application file for complete search history.

(56) References Cited

U.S. PATENT DOCUMENTS

| | | | | |
|---|---|---|---|---|
| 5,065,808 A | * | 11/1991 | Hopperdietzel | ........ E06B 9/115 160/229.1 |
| 6,095,225 A | * | 8/2000 | Miller | ...................... E06B 9/15 160/133 |
| 6,672,554 B2 | * | 1/2004 | Fukuo | .................... B60N 3/102 224/926 |
| 7,721,926 B2 | | 5/2010 | Thomas | |
| 2012/0305202 A1 | * | 12/2012 | Ganz | .................... B60N 2/4686 160/133 |

FOREIGN PATENT DOCUMENTS

| | | |
|---|---|---|
| CN | 1653244 A | 1/2009 |
| CN | 203111050 U | 8/2013 |
| DE | 10 2009 032 733 A1 | 2/2010 |
| DE | 20 2011 000 802 U1 | 8/2011 |
| EP | 0 596 389 A1 | 5/1994 |
| JP | 2008-120317 A | 5/2008 |
| WO | WO 2007/019926 A1 | 1/2007 |

OTHER PUBLICATIONS

DE 20 2011 000 802 U1 Abstract English Translation.*
(Continued)

*Primary Examiner* — Jeffrey R Allen
(74) *Attorney, Agent, or Firm* — Renner, Otto, Boisselle & Sklar, LLP

(57) ABSTRACT

A blind for closing an opening of a storage compartment in a central console of a motor vehicle is provided. In order that a linear guide means of the blind has a small curve radius, the invention proposes to construct the blind with chain members onto which slats are snapped.

8 Claims, 2 Drawing Sheets

(56) References Cited

OTHER PUBLICATIONS

German Search Report dated Nov. 17, 2015 for German Application No. 10 2015 004 050.2.
Chinese Office Action dated Sep. 30, 2017, for corresponding Application No. 2016/10175032.4 (English summary).
Chinese Search Report dated Sep. 22, 2017, for corresponding Application No. 2016/10175032.4.

* cited by examiner

BLIND ESPECIALLY FOR STORAGE COMPARTMENT IN A MOTOR VEHICLE

CROSS-REFERENCE TO RELATED APPLICATION

The present application claims priority under 35 USC § 119 to German Patent Application No. 10 2015 004 013.8, filed on Mar. 27, 2015, the entire disclosure of which are incorporated herein by reference.

TECHNICAL FIELD OF THE INVENTION

The invention relates to a blind for closing an opening. In particular, the blind is intended for closing a storage compartment in a motor vehicle.

DESCRIPTION OF THE RELATED ART

Such a blind for closing a storage compartment in a motor vehicle is known from Offenlegungsschrift DE 10 2009 032 733 A1. The storage compartment is arranged in a central console of a motor vehicle and is open at the top. It has two mutually parallel side walls in which grooves are provided as linear guide means for the blind. The grooves are open on sides that face one another and are congruent seen from one side. They initially run in a straight line at the top along an opening of the storage compartment and then run downwards in a curve around one end of the storage compartment into a further straight section under the storage compartment. Slats of the blind are slidably guided in the grooves forming the linear guide means. The slats are arranged one after the other in a sliding direction and the slats are articulatedly connected to one another, which means that they are pivotable relative to one another in such a way that they are able to slide together through the straight and the curved sections of the linear guide means. Transversely with respect to the sliding direction, the slats extend from one side of the storage compartment to another and, as already described, are at their lateral ends slidably guided in the grooves in the mutually parallel side walls of the storage compartment, which grooves form the linear guide means.

SUMMARY OF THE INVENTION

The problem of the invention is to propose a blind of the kind described above which enables its linear guide means to have a small curve radius. A small curve radius of the linear guide means is to be understood as meaning small in relation to a length of slats of the blind in the sliding direction.

That problem is solved by the invention as described herein. For example, a blind has one or more chains having chain members which are connected to one another with joints so as to be pivotable about pivot axes and are slidably guided with a linear guide means. At the chain members, especially on the chain members, there are arranged slats of the blind, which slats are pivotally connected by means of the articulated connection of the chain members of the chain and are able to slide together along the linear guide means and, in curved sections and generally in non-straight sections of the linear guide means, are pivotable relative to one another. The chain enables the linear guide means to have a small curve radius, especially if the slats are arranged on the chain members and on an outer side of curved sections of the linear guide means. A further advantage of the invention is the possibility of using different slats on blinds of otherwise identical construction. This makes it possible, with little outlay, for the blinds to have a different appearance but, apart from the slats, to have the same components.

One arrangement of the invention provides a snap connection of the slats on the chain members. As a result, the slats can be quickly mounted and even exchanged.

In a preferred arrangement of the invention, the slats project laterally beyond the linear guide means so that they cover the linear guide means. This protects the linear guide means from soiling and enables the blind to have an attractive visual design.

In one arrangement of the invention, the chain members have guide elements which are pivotally mounted and slidably guided with the linear guide means. Such guide elements can be, for example, guide pins which project laterally from the chain members and project into grooves, as linear guide means, in which they are able to rotate and slide. The guide elements are coaxial with pivot axes of the joints which pivotally connect the chain members.

One arrangement of the invention provides strip-shaped chain members. In a development of the invention, the slats are arranged staggered relative to the chain members in the sliding direction. As a result, the slats cover gaps between the chain members, and the strip-shaped chain members are located below or behind gaps between the slats, so that the blind covers an opening without through-gaps.

To avoid rattling noises, one arrangement of the invention provides resilient rattle-reducing elements for the linear guide means. The resilient rattle-reducing elements can be arranged on guide elements of the chain members and/or on the linear guide means in such a way that the guide elements are guided without play.

BRIEF DESCRIPTION OF THE DRAWING

The invention is described in greater detail below with reference to an exemplary embodiment shown in the drawing. In the drawing.

DETAILED DESCRIPTION OF THE INVENTION

Figure 1:
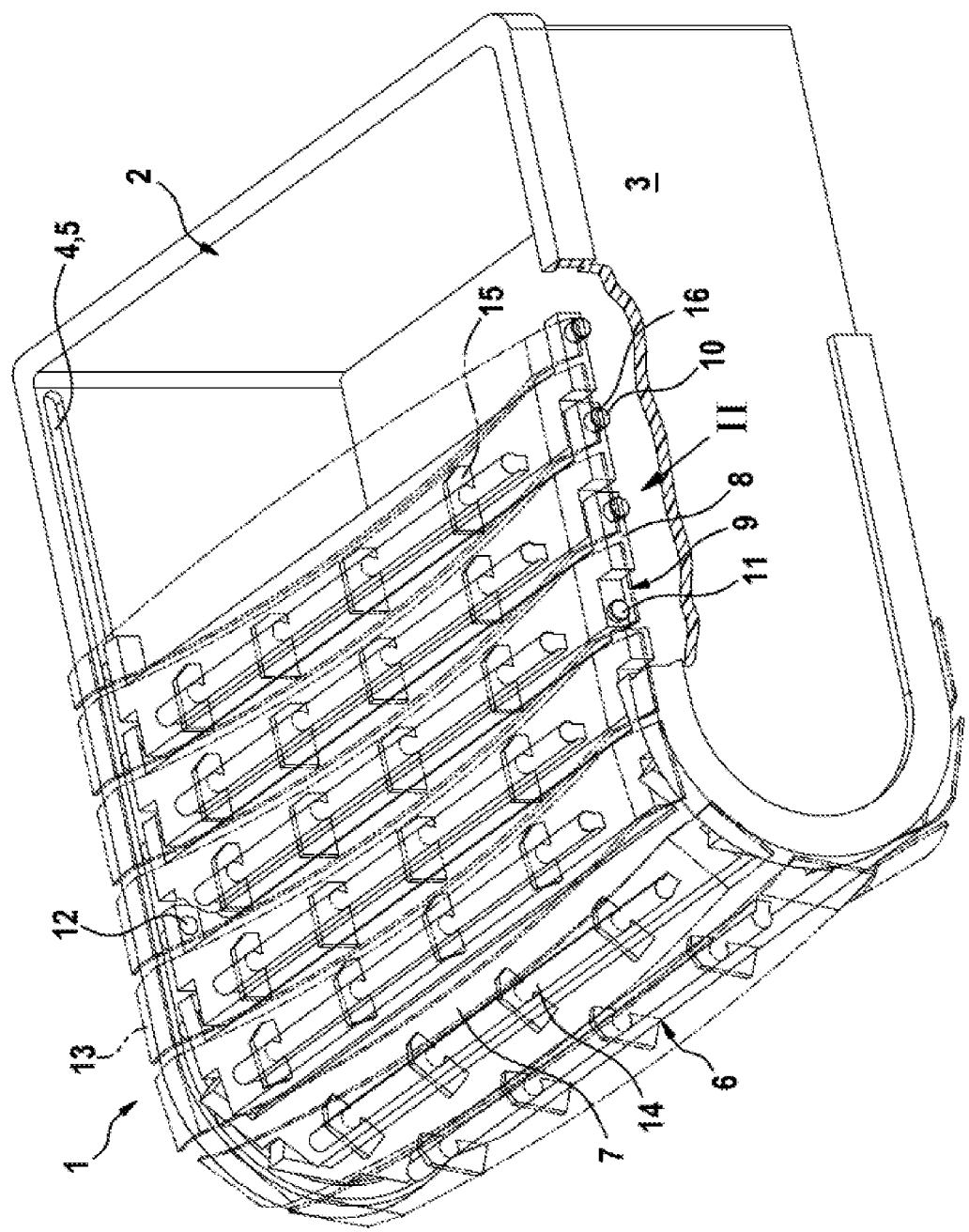
FIG. 1 is a perspective view of a blind according to the invention.

The blind 1 according to the invention shown in FIG. 1 serves for closing an opening of a storage compartment 2 in a motor vehicle (not shown). The storage compartment 2 is arranged in a central console of the motor vehicle; it is box-shaped and in an intended installed position is open at the top, that is to say the opening arranged to be closed with the blind 1 is at the top in the exemplary embodiment.

The storage compartment 2 has two mutually parallel side walls 3 which have grooves 4 on their inner sides that face one another, which grooves form a linear guide means 5. Seen from one side, the grooves 4 forming the linear guide means 5 are congruent; they run in a straight line along the opening of the storage compartment 2, then at an end of the storage compartment 2 follow curves which pass around the end of the storage compartment 2 and continue on an underside of the storage compartment 2.

The blind 1 has a chain 6 having strip-shaped chain members 7 which are arranged one after the other in a sliding direction and extend transversely from one side wall 3 of the storage compartment 2 to another. At their lateral ends the chain members 7 have cranked portions 8 which each project into a complementary recess 9 of a respective following chain member 7. On the cranked portions 8, the chain members 7 have laterally outwardly projecting guide pins 10 which project into the grooves 4 in the side walls 3 of the storage compartment 2 forming the linear guide means 5, so that the chain members 7 are slidably guided in the longitudinal direction of the linear guide means 5. By means of the guide pins 10, the chain members 7 are also pivotally mounted in the grooves 4 forming the linear guide means 5. The guide pins 10 can also be understood generally as being guide elements on which the linear guide means 5 effects slidable guidance and at the same time pivotal mounting of the chain members 7.

Coaxially with the guide pins 10, the chain members 7 have, in the recesses 9, pivot pins 11 which project into bearing holes 12 on inner sides of the cranked portions 8 of an adjacent chain member 7. The pivot pins 11 and bearing holes 12 articulatedly connect the chain members 7 to one another about notional pivot axes which extend transversely with respect to the sliding direction in a surface defined by the grooves 4 forming the linear guide means 5. The pivot pins 11, which are pivotable in the bearing holes 12, can also be understood as joints 11, 12 which pivotally connect the chain members 7 to one another. As a result of the articulated connections, the chain members 7 are slidable together along the linear guide means 5 and are pivotable relative to one another, so that they are able to slide through the curve of the linear guide means 5.

Strip-shaped slats 13 are arranged on the chain members 7. As can be seen in FIG. 1, the slats 13 are curved in side view and they are at least as wide as the storage compartment 2 is wide on the outside, so that the slats 13 project laterally beyond the linear guide means 5 and cover the linear guide means 5. "Wide" means an extent of the slats 13 transverse with respect to the sliding direction. For attachment of the slats 13, the chain members 7 have a rib 14 of mushroom-shaped cross-section, which rib extends transversely with respect to the sliding direction. The slats 13 have ribs 15 which are arranged in the sliding direction and which have a cut-out, congruent with the ribs 14 of the chain members 7, with which they are snapped onto the ribs 14 or the chain members 7 of the chain 6. The ribs 15 of the slats 13 which have been snapped onto the cross-sectionally mushroom-shaped ribs 14 of the chain members 7 can also be understood as a snap connection 14, 15. In the sliding direction, the slats 13 are arranged staggered with respect to the chain members 7 so that gaps between the slats 13 are staggered with respect to gaps between the chain members 7. It is not possible to "see through" the slats 13 and the chain members 14, but rather the slats 13 together with the chain members 7 have no through-gap perpendicular to the surface defined by the grooves 4 forming the linear guide means 5.

Figure 2:
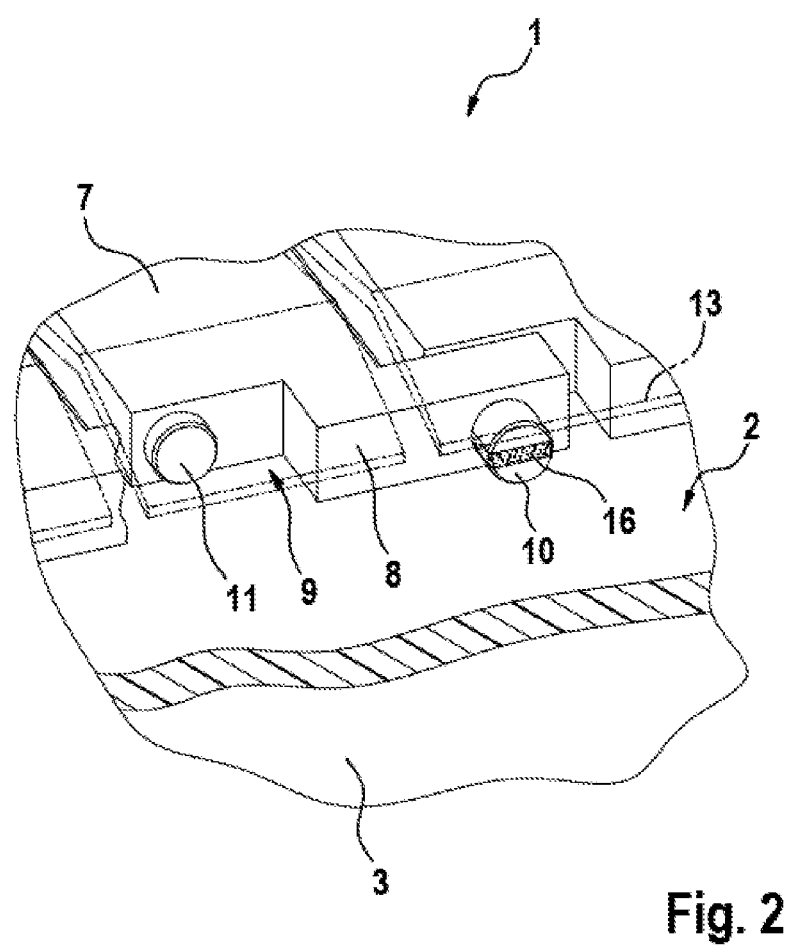
FIG. 2 is an enlarged view of a detail in accordance with arrow II in FIG. 1.

As can be seen in FIG. 2, the guide pins 10 have a slot by means of which they are able to give resiliently transversely with respect to the grooves 4 forming the linear guide means 5. In the slot there is arranged an elastomer as resilient rattle-reducing element 15, which can also be understood as a resilient element. The guide pins 10 rest under a slight resilient bias against walls of the grooves 4, against which walls the guide pins 10 are urged by the resilient rattle-reducing elements 15. In that way the guide pins 10 are guided without play in the grooves 4 forming the linear guide means 5, with the result that rattling of the blind 1 is avoided.

LIST OF REFERENCE NUMERALS

Blind especially for a storage compartment in a motor vehicle
1 blind
2 storage compartment
3 side wall
4 groove
5 linear guide means
6 chain
7 chain member
8 cranked portion
9 recess
10 guide pin
11 pivot pin
12 bearing hole
13 slat
14 rib
15 rib
16 rattle-reducing element

The invention claimed is:

1. A blind for closing an opening comprising:
   slats which are arranged one after the other in a sliding direction, the slats having gaps therebetween;
   a linear guide means for slidable guidance of the slats; and,
   a chain having chain members which are pivotally connected to one another with joints and are slidably guided with the linear guide means, the chain members being strip-shaped and having gaps therebetween, all of the chain members being arranged in a common first plane parallel to the linear guide means,
   wherein the slats are discrete relative to the chain members, the slats being arranged on the chain members and staggered with respect to the chain members in the sliding direction, the slats being arranged in a common second plane located above or in front of the common first plane with the chain members being located below or behind the gaps between the slats, and
   wherein each of the slats has a span extending in the common second plane across two adjacent chain members, the slats covering the gaps between the chain members.

2. The blind according to claim 1, wherein the blind has a snap connection for the slats on the chain members.

3. The blind according to claim 1, wherein the slats project laterally beyond the linear guide means.

4. The blind according to claim 1, wherein the chain members have guide elements which are pivotally mounted and slidably guided with the linear guide means, and the guide elements are coaxial with pivot axes of the joints which connect the chain members.

5. The blind according to claim 1, wherein the blind has resilient rattle-reducing elements for the linear guide means.

6. The blind according to claim 2, wherein the slats project laterally beyond the linear guide means.

7. The blind according to claim 2, wherein the chain members have guide elements which are pivotally mounted and slidably guided with the linear guide means, and the guide elements are coaxial with pivot axes of the joints which connect the chain members.

8. The blind according to claim 3, wherein the chain members have guide elements which are pivotally mounted and slidably guided with the linear guide means, and the guide elements are coaxial with pivot axes of the joints which connect the chain members.

\* \* \* \* \*